United States Patent
Lee et al.

(10) Patent No.: US 9,619,921 B2
(45) Date of Patent: Apr. 11, 2017

(54) METHOD AND APPARATUS FOR PERFORMING RAY TRACING FOR RENDERING IMAGE

(71) Applicant: Samsung Electronics Co., Ltd., Suwon-si (KR)

(72) Inventors: Jae-don Lee, Yongin-si (KR); Young-sam Shin, Hwaseong-si (KR); Won-jong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 14/263,488

(22) Filed: Apr. 28, 2014

(65) Prior Publication Data
US 2015/0109302 A1    Apr. 23, 2015

(30) Foreign Application Priority Data
Oct. 21, 2013    (KR) ........................ 10-2013-0125545

(51) Int. Cl.
*G06T 15/50* (2011.01)
*G06T 15/06* (2011.01)

(52) U.S. Cl.
CPC .............. *G06T 15/06* (2013.01); *G06T 15/50* (2013.01)

(58) Field of Classification Search
None
See application file for complete search history.

(56) References Cited

U.S. PATENT DOCUMENTS

| 8,063,902 | B2 | 11/2011 | Salsbury et al. | |
|---|---|---|---|---|
| 2009/0284523 | A1* | 11/2009 | Peterson | G06T 15/005 345/419 |
| 2010/0060637 | A1* | 3/2010 | Shearer | G06T 15/06 345/426 |
| 2010/0164948 | A1* | 7/2010 | Kho | G06T 15/06 345/419 |

FOREIGN PATENT DOCUMENTS

| KR | 10-2009-0065353 A | 6/2009 |
|---|---|---|
| KR | 10-2011-0059037 A | 6/2011 |

* cited by examiner

*Primary Examiner* — Frank Chen
(74) *Attorney, Agent, or Firm* — NSIP Law

(57) ABSTRACT

Provided are methods and apparatuses of performing ray tracing for rendering an image. The method includes performing, at a ray tracing core, a first intersection test based on a traversal of an acceleration structure using a generated primary ray, generating at least one type of secondary ray based on the first intersection test, classifying the generated secondary rays and storing identification information indicating a starting point and a direction of the secondary rays, and performing a second intersection test and shading using the stored identification information.

36 Claims, 9 Drawing Sheets

METHOD AND APPARATUS FOR PERFORMING RAY TRACING FOR RENDERING IMAGE

RELATED APPLICATIONS

This application claims the benefit under 35 USC 119(a) of Korean Patent Application No. 10-2013-0125545, filed on Oct. 21, 2013, in the Korean Intellectual Property Office, the entire disclosure of which is incorporated herein by reference for all purposes.

BACKGROUND

1. Field

The following description relates to methods and apparatuses for performing ray tracing for rendering an image.

2. Description of Related Art 3D rendering refers to image processing whereby 3D object data is synthesized to an image viewed at a given viewpoint of a camera. Ray tracing refers to a process of tracing a point where scene objects, which are objects subject to rendering, and a ray intersect with each other.

Ray tracing includes traversal of an acceleration structure and an intersection test between a ray and a primitive. In the traversal and the intersection test, a large number of computations and a broad memory bandwidth are needed. Thus, it is desirable to reduce the number of computations and the bandwidth.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of performing ray tracing to render an image, the method including performing, at a ray tracing core, a first intersection test based on a traversal of an acceleration structure using a generated primary ray, generating at least one type of secondary ray based on the first intersection test, classifying the generated secondary rays and storing identification information indicating a starting point and a direction of the secondary rays, and performing a second intersection test and shading using the stored identification information.

The secondary rays may include generating at least one shadow ray based on a number of light sources, and generating at least one of a reflection ray or a refraction ray based on the second intersection test.

The performing of the second intersection test and shading may include performing the second intersection test and shading using the identification information corresponding to a shadow ray from among the secondary rays, and performing a third intersection test and a second shading using the identification information corresponding to a reflection ray from among the secondary rays, after the second intersection test and the shading is performed.

The performing of the second intersection test and shading may include performing the second intersection test and shading using the identification information corresponding to a shadow ray from among the secondary rays, and performing a third intersection test and a second shading using the identification information corresponding to a refraction ray from among the secondary rays, after the second intersection test and the shading is performed.

The storing of the identification information may include storing the identification information by allocating different buffer sizes based on the type of the secondary rays.

The storing of the identification information may include allocating the buffer sizes based on at least one of a number of light sources, a depth of a reflection ray included in the secondary rays, or a depth of a refraction ray included in the secondary ray.

The method may include counting the number of secondary rays based on the stored identification information, wherein the performing of the second intersection test and shading comprises performing the second intersection test and shading using the stored identification information in response to the number of counted secondary rays being equal to or greater than a number of batches of stored identification information.

The method may include regenerating the primary ray in response to the number of counted secondary rays being less than the number of batches, and wherein the performing of the intersection test comprises performing the intersection test using the regenerated primary ray.

In another general aspect, there is provided an apparatus for performing ray tracing to render an image, the apparatus including a processor configured to perform a first intersection test based on a traversal of an acceleration structure using a generated primary ray and to generate at least one type of secondary ray based on the first intersection test, and a memory configured to classify the generated secondary rays and to store identification information indicating a starting point and a direction of the secondary rays, wherein the processor is further configured to perform a second intersection test based on a traversal of the acceleration structure using the stored identification information and to perform shading based on the second intersection test.

The types of the secondary rays may include at least one of a reflection ray, a refraction ray, or a shadow ray.

The secondary ray generated by the processor may include at least one shadow ray based on the number of light sources, and the processor is further configured to generate at least one of a reflection ray or a refraction ray based on the second intersection test.

The processor may be further configured to perform the second intersection test using the identification information corresponding to a shadow ray from among the secondary rays, and to perform a third intersection test using the identification information corresponding to a reflection ray from among the secondary rays, after the second intersection test and shading are performed.

The processor may be further configured to perform the second intersection test using the identification information corresponding to a shadow ray from among the secondary rays, and to perform a third intersection test using the identification information corresponding to a refraction ray from among the secondary rays, after the second intersection test and shading are performed.

The memory may be further configured to store the identification information by allocating different buffer sizes based on the type of the secondary rays.

The memory may be further configured to allocate the buffer sizes based on at least one of a number of light sources, a depth of a reflection ray included in the secondary rays, or a depth of a refraction ray included in the secondary ray.

The apparatus may include a counting unit configured to count the number of secondary rays based on the stored identification information, wherein the processor is further configured to perform the second intersection test using the stored identification information in response to the number of counted secondary rays being equal to or greater than a number of batches of stored identification information.

The processor may be further configured to regenerates the primary ray in response to the number of counted secondary rays being less than the number of batches, and to perform the intersection test using the regenerated primary ray.

Other features and aspects will be apparent from the following detailed description, the drawings, and the claims.

Figure 1:
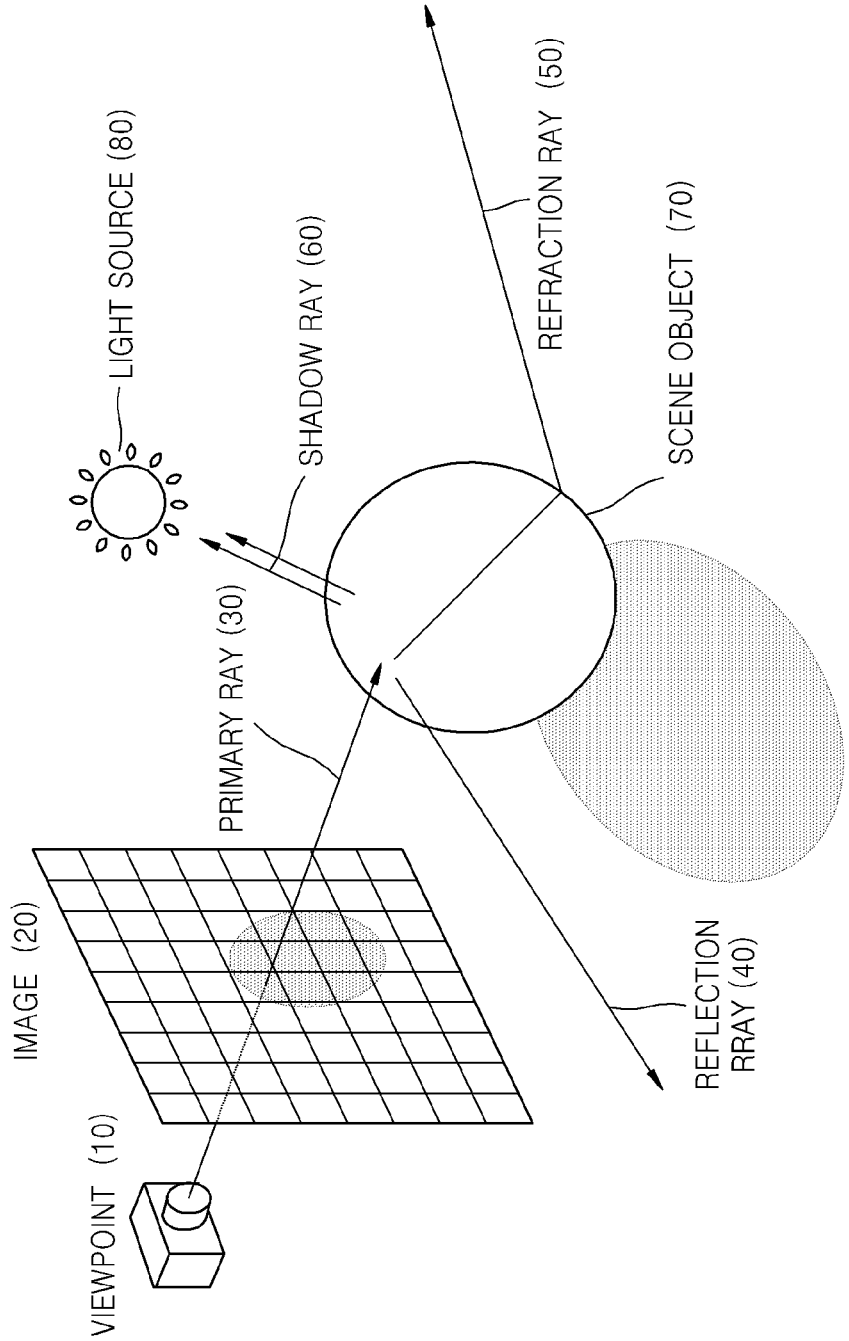
FIG. 1 is a diagram illustrating an example of a ray tracing method.

Throughout the drawings and the detailed description, unless otherwise described, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram illustrating an example of a ray tracing method. Referring to FIG. 1, in three-dimensional (3D) modeling, a ray tracing core may determine a viewpoint 10 and an image 20 based on the viewpoint 10. When the viewpoint 10 and the image 20 are determined, the ray tracing core generates a ray from the viewpoint 10 with respect to each pixel of the image 20.

In ray tracing, a primary ray 30 is generated from the viewpoint 10. The primary ray 30 intersects with a scene object 70 after passing the image 20. At an intersection point between the primary ray 30 and the scene object 70, a reflection ray 40 and a refraction ray 50 are generated. Also, a shadow ray 60 is generated at the intersection point toward a light source 80. The reflection ray 40, the refraction ray 50, and the shadow ray 60 are referred to as secondary rays. The scene object 70 denotes an object that is to be rendered with respect to the image 20. The scene object 70 includes a plurality of primitives.

Though a single light source 80 is illustrated in FIG. 1 but the disclosure is not limited thereto. A plurality of light sources 80 are considered to be well within the scope of the present disclosure, and may be included according to a condition of an image that is subjected to rendering, or no light source 80 may be included.

The ray tracing core analyzes the primary ray 30, the secondary rays, i.e., the reflection ray 40, the refraction ray 50, and the shadow ray 60, and rays derived from the secondary rays. The ray tracing core determines a color value of each of the pixels that form the image 20 based on a result of the analysis. The ray tracing core determines color values of pixels by considering characteristics of the scene object 70.

Figure 2:
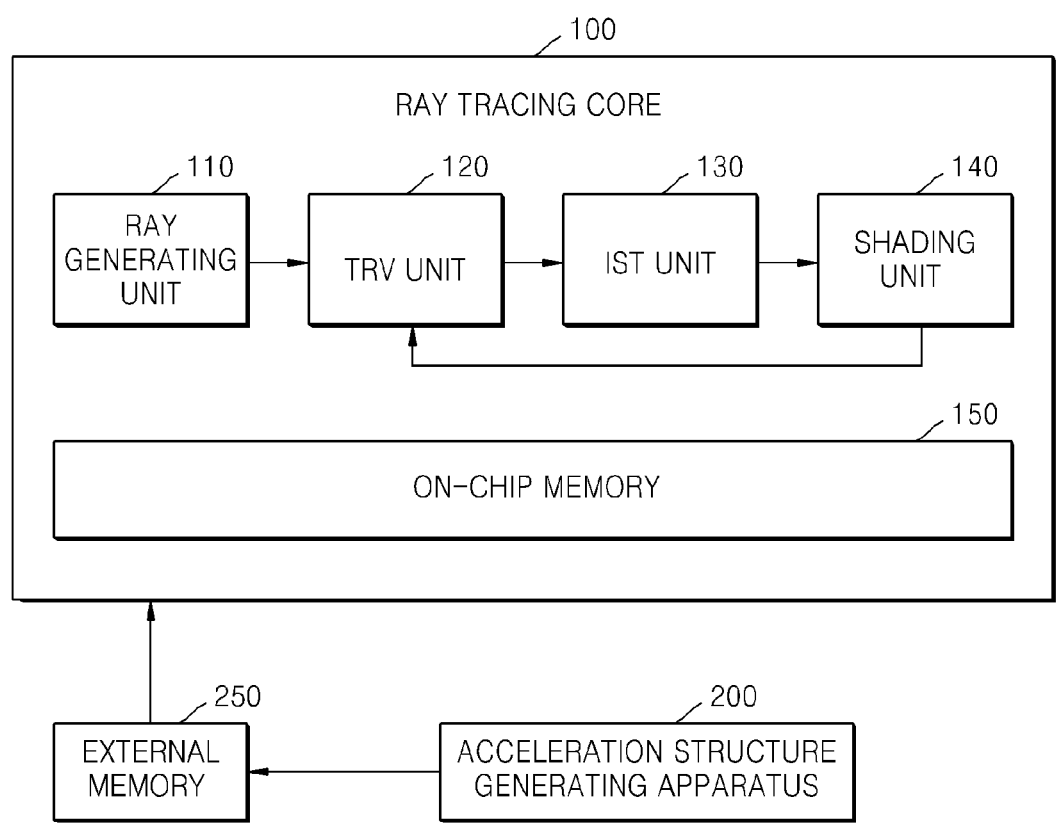
FIG. 2 is a diagram illustrating an example of a ray tracing.

FIG. 2 is a diagram illustrating an example of a ray tracing system. Referring to FIG. 2, the ray tracing system includes a ray tracing core 100, an acceleration structure generating apparatus 200, and an external memory 250. The ray tracing core 100 includes a ray generating unit 110, a traversal (TRV) unit 120, an intersection test (IST) unit 130, a shading unit 140, and an on-chip memory 150.

In FIG. 2, the TRV unit 120 and the IST unit 130 are included in the ray tracing core 100, but the TRV unit 120 and the IST unit 130 may also be provided separately without departing from the spirit and scope of the illustrative examples described.

The ray tracing core 100 of FIG. 2 includes only elements related to the illustrated example. However, it is understood that those skilled in the art may include other general elements in the ray tracing core 100.

The examples shown in FIG. 2 are only non-exhaustive illustrations, and other configurations are considered to be well within the scope of the present disclosure. For example, the ray generating unit 110, the TRV unit 120, the IST unit 130, and the shading unit 140 of the ray tracing core 100 illustrated in FIG. 2 may correspond to a single or multiple processors. A processor may be formed of an array including a plurality of logic gates, or of a combination of a microprocessor and a memory in which a program that is executable on the microprocessor is stored. Also, it will be obvious to one of ordinary skill in the art that the processor may be implemented in other forms of hardware.

The ray tracing core 100 may trace an intersection point between generated rays and objects located in three-dimensional (3D) space, and may determine a color value of each of the pixels that form an image. The ray tracing core 100 may search for an intersection point between rays and objects, and may generate a secondary ray based on characteristics of an object at the intersection point, and may determine a color value of the intersection point. The ray generating unit 110 generates a primary ray. The ray tracing unit 110 may generate a primary ray toward a scene object from a viewpoint.

For ease of explanation, it is assumed that the ray generating unit 110 generates a primary ray, and the shading unit 140 generates a secondary ray. However, the shading unit 140 may generate a primary ray and the ray generating unit 140 may generate a secondary ray. In other words, a primary ray and a secondary ray may be generated either using the ray generating unit 110 or using the shading unit 140. When the shading unit 140 generates both a primary ray and a secondary ray, the ray generating unit 110 may not be included in the ray tracing core 100.

When the ray generating unit 110 generates a primary ray, the on-chip memory 150 may allocate a predetermined buffer in the on-chip memory 150. The ray generating unit 110 may generate a primary ray using the predetermined buffer allocated in the on-chip memory 150.

The TRV unit 120 traverses an acceleration structure, and the IST unit 130 may perform an intersection test using the generated primary ray. Hereinafter, an example where the TRV unit 120 and the IST unit 130 conduct an intersection test will be described.

The TRV unit 120 may receive information about a ray generated by the ray generating unit 110. The generated ray may be a primary ray 30, a secondary ray, or a ray derived from the secondary ray. For example, the TRV unit 120 may receive information about a viewpoint and a direction of a generated ray when the generated ray is a primary ray. A viewpoint of a ray may be expressed in coordinates, and a direction may be expressed in vector notation.

The TRV unit 120 reads information about an acceleration structure from an external memory 250. The acceleration structure generating apparatus 200 generates an acceleration structure, and the generated acceleration structure is stored in the external memory 250. An acceleration structure refers to a structure including position information of objects in 3D space. For example, an acceleration structure may be a K-dimensional (KD) tree or a bounding volume hierarchy (BVH).

The TRV unit 120 traverses an acceleration structure to output an object or a leaf node that a ray has hit. The TRV unit 120 searches for nodes included in an acceleration structure to output a leaf node which a ray has hit from among lowermost-ranking leaf nodes, to the IST unit 130. The TRV unit 120 determines which of bounding boxes that form an acceleration structure is hit by a ray. The TRV unit 120 determines which of objects included in a bounding box is hit by a ray. The TRV unit 120 stores information about an object that has been hit in a TRV cache. A bounding box denotes a unit including a plurality of objects or a plurality of primitives. A bounding box may be expressed in different forms according to an acceleration structure.

When the TRV unit 120 traverses an acceleration structure, the on-chip memory 150 may allocate a predetermined buffer (a job buffer 154 of FIG. 4) for the traversal. The TRV unit 120 may traverse an acceleration structure using the predetermined buffer allocated in the on-chip memory 150 (the job buffer 154 of FIG. 4). A buffer used in traversal of an acceleration structure by the TRV unit (the job buffer 154 of FIG. 4) will be described in detail with reference to FIG. 4.

The IST unit 130 receives an object or a leaf node that a ray has hit, from the TRV unit 120. The IST unit 130 may read information about primitives included in a hit object, from the external memory 250. The information about the read primitives may be stored in the predetermined buffer allocated in the on-chip memory 150 (the job buffer 154 of FIG. 4). The predetermined buffer allocated in the on-chip memory 150 (the job buffer 154 of FIG. 4) may indicate a buffer in which data used by the IST unit 130 in an intersection test is temporarily stored.

The IST unit 130 performs an intersection test on rays and primitives, and outputs primitives hit by a ray and an intersection point. The IST unit 130 receives information regarding an object that is hit by a ray from the TRV unit 120. The IST unit 130 performs a test on which primitive from among a plurality of primitives included in the hit object is hit by a ray. The IST unit 130 searches for a primitive that is hit by a ray, and outputs an intersection point indicating which point of the hit primitive intersects with the ray. The intersection point may be output to the shading unit 140 as coordinates.

The shading unit 140 determines a color value of a pixel based on information about an intersection point, received from the IST unit 130, and characteristics of a material of the intersection point. The shading unit 140 may determine a color value of a pixel in consideration of a basic color of a material of the intersection point and the effect of a light source. The shading unit 140 also generates secondary rays of at least one type, based on a result of the intersection test. Examples of the secondary ray include a reflection ray, a refraction ray, and a shadow ray.

The shading unit 140 may generate a secondary ray based on information about a material of an intersection point. In detail, as a phenomenon of light reflection or refraction varies according to characteristics of a material of a scene object, the shading unit 140 may generate a secondary ray such as a reflection ray or a refraction ray according to material characteristics. Also, the shading unit 140 may generate a shadow ray based on a location of a light source.

The shading unit 140 may generate a reflection ray, a refraction ray, or a shadow ray within a set number of times, or may determine the number of times of generating a reflection ray, a refraction ray, or a shadow ray according to characteristics of an object. For example, when it is assumed that M light sources are included and N batches of intersection points to be processed are included, the shading unit 140 may generate up to N reflection rays, up to N refraction rays, and up to M*N shadow rays, with respect to a single primary ray.

The shading unit 140 according to the current embodiment may generate at least one shadow ray based on a result of an intersection test and the number of light sources and may generate a reflection ray and/or a refraction ray using the result of the intersection test after a shadow ray is generated.

In other words, the shading unit 140 may first generate a shadow ray according to the number and position of light sources, and the TRV unit 120 and the IST unit 130 may perform an intersection test using the generated shadow ray. Then, the shading unit 140 generates a reflection ray, and the TRV unit 120 and the IST unit 130 perform an intersection test using the generated reflection ray. Then, the shading unit 140 generates a refraction ray, and the TRV unit 120 and the IST unit 130 perform an intersection test using the generated refraction ray. A priority of generating or processing the reflection ray and the refraction ray may be exchanged.

In general, regarding a reflection ray and a refraction ray, a secondary ray is generated again based on a corresponding ray as a primary ray after an intersection test. However, in the case of a shadow ray, a secondary ray is not additionally generated after an intersection test. That is, although a shadow ray is a secondary ray that is generated according to the number and position of light sources, another secondary ray based on the shadow ray as a primary ray is not generated.

Accordingly, the shading unit 140 according to the present example may preferentially generate a shadow ray from among various types of secondary rays, and the TRV unit 120 and the IST unit 130 may preferentially perform an intersection test using the generated shadow ray, thereby quickly performing ray tracing.

When the shading unit 140 generates a secondary ray, the on-chip memory 150 allocates a predetermined buffer. The shading unit 140 generates a secondary ray using the predetermined buffer allocated in the on-chip memory 150. A buffer that is used when the shading unit 140 generates a ray will be described with reference to FIG. 4.

Figure 4:
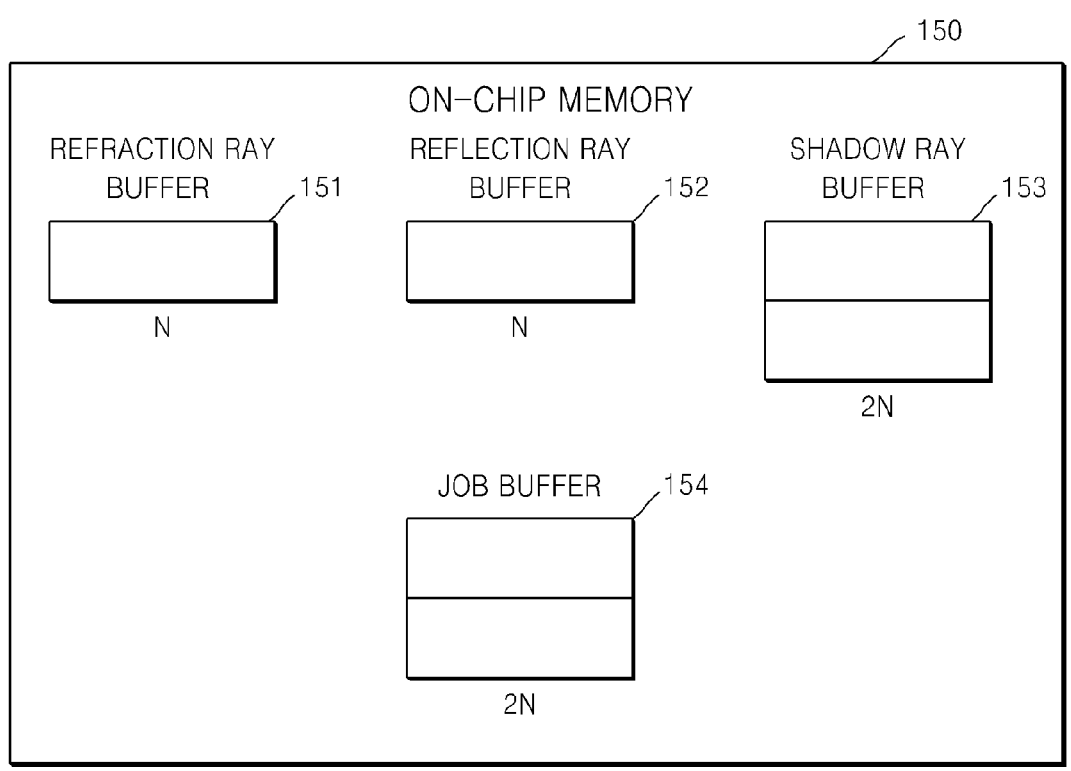
FIG. 4 is a diagram illustrating an example of a buffer allocated in an on-chip memory.

FIG. 4 is a diagram illustrating an example of a buffer allocated in the on-chip memory 150. The on-chip memory 150 allocates a buffer based on the type of secondary ray. Examples of types of secondary rays include a reflection ray, a refraction ray, and a shadow ray. Accordingly, a refraction ray buffer 151, a reflection ray buffer 152, and a shadow ray buffer 153 are allocated in the on-chip memory 150.

For example, when M light sources and N batches of intersection points are to be processed, and a maximum depth of a reflection ray is D1, and a maximum depth of a refraction ray is D2, the on-chip memory 150 allocates a size N for each of the refraction ray buffer 151 and the reflection ray buffer 152, and a size 2N for the shadow ray buffer 153. The refraction ray buffer 151, the reflection ray buffer 152, and the shadow ray buffer 153 are used when the shading unit 140 generates a secondary ray.

The shading unit 140 generates a shadow ray for each light source. An operation of generating a shadow ray using the shading unit 140 and an operation of transferring information on the generated ray to an external memory using the on-chip memory 150 are performed simultaneously. Thus, the on-chip memory 150 allocates a size 2N for the shadow ray buffer 153.

When the shading unit 140 has completed generating a secondary ray, the shading unit 140 transmits identification information about the generated secondary ray to the external memory 250.

The on-chip memory 150 allocates a size 2N for the job buffer 154 that is used in an intersection test that is performed by the TRV unit 120 and the IST unit 130 and in determining a color value of a pixel, performed by the shading unit 140.

Referring to FIG. 2, the ray tracing core 100 receives data needed for ray tracing from the external memory 250. The external memory 250 stores an acceleration structure or geometry data. An acceleration structure is generated by the acceleration structure generating apparatus 200 and is stored in the external memory 250. Geometry data refers to information about primitives. A primitive may be a polygon such as a triangle or a square, and geometry data may refer to information about vertexes or positions of primitives included in an object.

Also, the external memory 250 may classify the generated secondary rays according to types of the generated secondary rays. The external memory 250 may store identification information indicating a starting point and a direction of the secondary rays. The external memory 250 may store identification information by allocating sizes of buffers based on the types of the secondary rays.

A size of a buffer allocated by the external memory 250 is based on the number of light sources, the number of times corresponding to a depth of a reflection ray included in a secondary ray, and the number of times corresponding to a depth of a refraction ray included in a secondary ray. An example where a buffer is allocated in the external memory 250 will be described with reference to FIG. 5.

Figure 5:
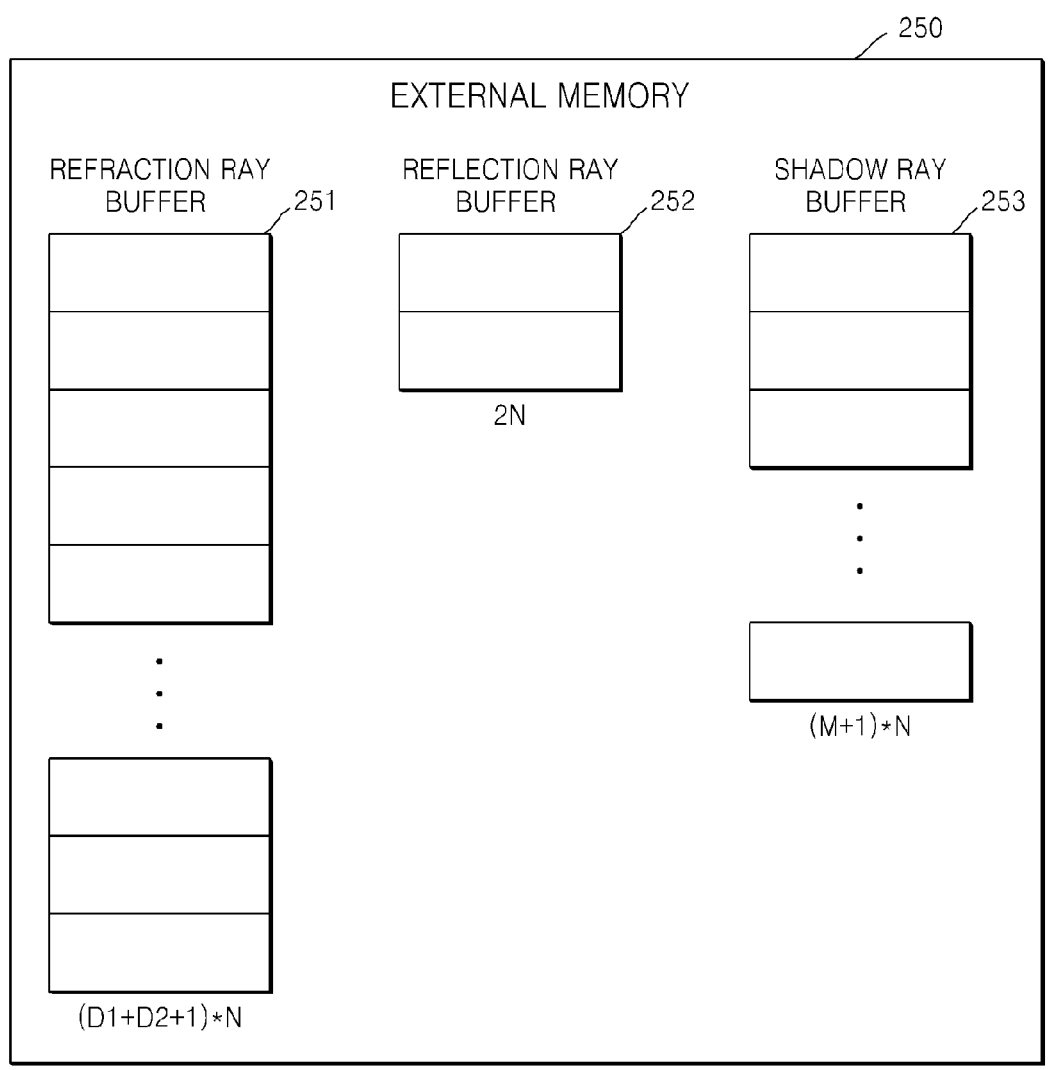
FIG. 5 is a diagram illustrating an example of a buffer allocated in an external memory.

FIG. 5 illustrates an example of a buffer allocated in the external memory 250. Referring to FIG. 5, the external memory 250 allocates a refraction ray buffer 251, a reflection ray buffer 252, and a shadow ray buffer 253 in the external memory 250. The external memory 250 classifies secondary rays according to type of ray corresponding to the allocated buffers and stores the same.

For example, when M light sources and N batches of intersection points are to be processed, and a maximum depth of a reflection ray is D1, and a maximum depth of a refraction ray is D2, the external memory 250 allocates a size (D1+D2+1)*N for the refraction ray buffer 251 and a size N+N for the reflection ray buffer 252, and a size M*N+N for the shadow ray buffer 253. The sizes are allocated to the refraction ray buffer 251, the reflection ray buffer 252, and the shadow ray buffer 253 for the reasons described below.

In regard to a reflection ray, the shading unit 140 regenerates only a reflection ray as a secondary ray that is obtained using a reflection ray as a primary ray. Also, N buffers are required as extra buffers. Thus, the external memory 250 allocates a size N+N for the reflection ray buffer 252.

In regard to a refraction ray, the shading unit 140 regenerates not only a reflection ray but also a refraction ray as a secondary ray that is obtained using a refraction ray as a primary ray. Also, N buffers are required as extra buffers. Thus, the external memory 250 allocates a size (D1+D2+1)*N for the refraction ray buffer 251.

In regard to a shadow ray, the shading unit 140 generates up to M*N shadow rays based on the number of light sources. Also, N buffers are required as extra buffers. Thus, the external memory 250 allocates a size M*N+N for the shadow ray buffer 253.

As described above, the external memory 250 classifies secondary rays according to type of ray and stores the same. The ray tracing core 100 performs an intersection test and shading by reading identification information from the external memory 250 according to the types of the secondary rays, thereby increasing locality of data during the intersection test and the shading.

Referring to FIG. 2 again, the acceleration structure generating apparatus 200 generates an acceleration structure that includes position information of objects in 3D space. The acceleration structure generating apparatus 200 divides 3D space into a hierarchical tree structure. The acceleration structure generating apparatus 200 may generate various types of acceleration structures. For example, the acceleration structure generating apparatus 200 may generate an acceleration structure that indicates a relationship between objects in 3D space by applying a BVH or a KD-tree. The acceleration structure generating apparatus 200 may determine the maximum number of primitives of lead nodes and a depth of tree, and may generate an acceleration structure based on the determined maximum number of primitives and the determined depth of tree.

Figure 3:
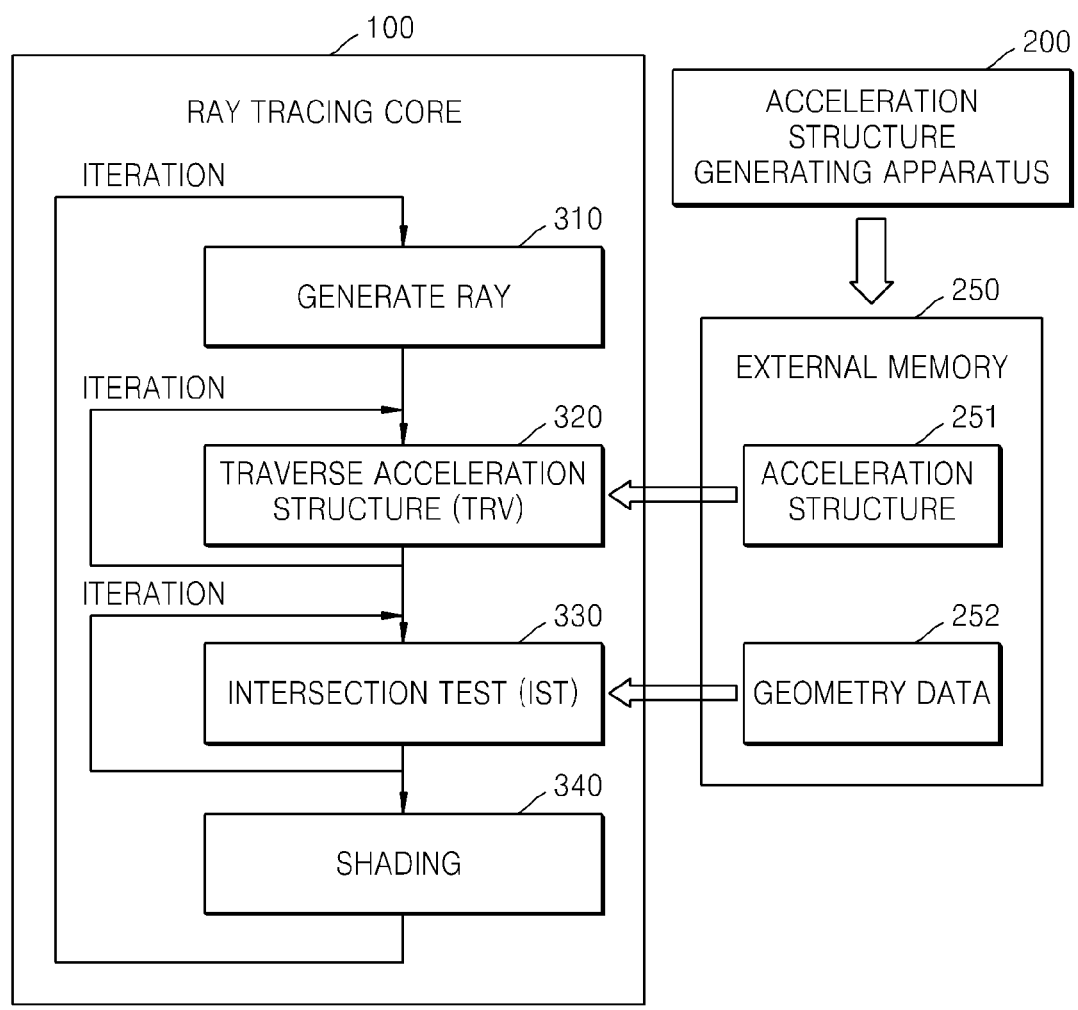
FIG. 3 is a diagram illustrating an example to explain ray tracing performed by a ray tracing core.

FIG. 3 is a diagram illustrating an example to explain ray tracing performed by the ray tracing core 100. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. FIG. 3 is a diagram to explain an operation of the example ray tracing core 100 that is illustrated in FIG. 2. Thus, descriptions of the ray tracing core 100 also applies to the ray tracing of FIG. 3, and will not be repeated here.

In operation 310, the ray tracing core 100 generates a primary ray. The ray generating unit 110 generates a primary ray using information stored in the job buffer 154 of the on-chip memory 150.

In operation 320, the ray tracing core 100 traverses an acceleration structure 251. The TRV unit 120 traverses the acceleration structure 251 using information stored in the job buffer 154 in the on-chip memory 150.

The acceleration structure 251 is read from the external memory 250. The ray tracing core 100 may traverse the acceleration structure 251 based on a viewpoint and a direction of generated rays, thereby detecting a bounding box that is hit by a ray. The ray tracing core 100 may detect an object hit by a ray from among objects included in the hit bounding box. The ray tracing core 100 repeats traversal of the acceleration structure 251 until a hit object is detected. The ray tracing core 100 may traverse an acceleration structure along any path, and if a leaf node on the traversed path is not hit by a ray, the ray tracing core 100 may further traverse the acceleration structure 251 along another path.

In operation 330, the ray tracing core 100 performs an intersection test. The IST unit 120 may perform an intersection test using information stored in the job buffer 154 of the on-chip memory 150.

The ray tracing core 100 reads geometry data 252 of primitives from the external memory 250. The ray tracing core 100 performs an intersection test based on the geometry data 252 that it reads. The ray tracing core 100 repeats the intersection test until a hit primitive is detected. The ray tracing core 100 may perform an intersection test on any primitive, and if a primitive is not hit by a ray, the ray tracing core 100 performs an intersection test on another primitive.

The ray tracing core 100 performs shading of a pixel based on an intersection test. In detail, the shading unit 140 determines a color value of a pixel using information stored in the job buffer 154.

The shading unit 140 generates a secondary ray using the refraction ray buffer 151, the reflection ray buffer 152, and the shadow ray buffer 153. The shading unit 140 first generates a shadow ray using the shadow ray buffer 153. When a traversal of an acceleration structure, an intersection test, and shading of the generated shadow ray are completed, the shading unit 140 generates a reflection ray using the reflection ray buffer 152. When a traversal of an acceleration structure, an intersection test, and shading with respect to the generated reflection ray are completed, the shading unit 140 generates a refraction ray using the refraction ray buffer 151. The order of generating a reflection ray and a refraction ray using the shading unit 140 may be interchanged.

The shading unit 140 stores the generated secondary ray in each of the refraction ray buffer 251, the reflection ray buffer 252, and the shadow ray buffer 253 in the external memory 250.

When operation 340 is completed, the ray tracing core 100 proceeds to operation 310. The ray tracing core 100 repeats operations 310 through 340 with respect to all pixels that form an image.

As described above, information about the generated secondary ray may be transmitted to and stored in the external memory 250. The ray tracing core 100 may read identification information regarding the generated secondary ray from the external memory 250 based on the type of secondary ray, and performs traversal of an acceleration structure, an intersection test, and shading. The fore-mentioned operations will be described below with reference to FIG. 6.

Figure 6:
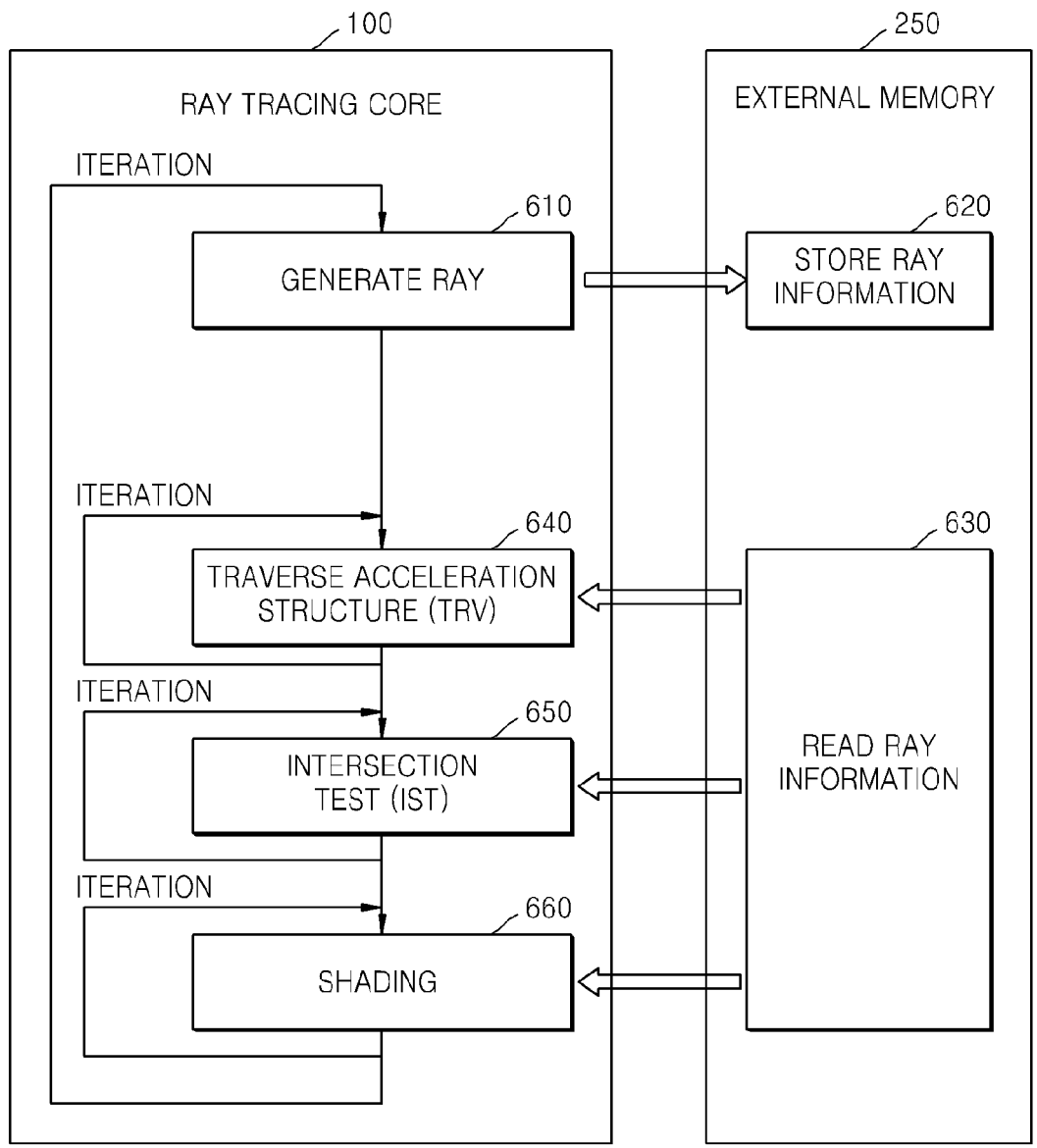
FIG. 6 is a diagram illustrating an example of a method of generating a secondary ray, traversing an acceleration structure using the generated secondary ray, and performing an intersection test and shading, using a ray tracing core.

FIG. 6 is a diagram illustrating an example of a method of generating a secondary ray, traversing an acceleration structure using the generated secondary ray, and performing an intersection test and shading using the ray tracing core 100. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently.

FIG. 6 is a diagram to explain an operation of the ray tracing core 100 described above with reference to FIG. 2. Thus, descriptions of the ray tracing core 100 also applies to the ray tracing of FIG. 6, and will not be repeated here.

In operation 610, the ray tracing core 100 generates a secondary ray. The ray tracing core 100 first generates a shadow ray from among secondary rays. In operation 620, the external memory 250 stores identification information about the generated shadow ray in the shadow ray buffer 253.

In operation 630, the external memory 250 reads identification information about a shadow ray based on a signal transmitted from the ray tracing core 100 and transmits the read information to the ray tracing core 100. The transmitted information is stored in the job buffer 154 in the on-chip memory 150 of the ray tracing core 100. In operations 640 and 650, the ray tracing core 100 traverses an acceleration structure and performs an intersection test using the read information.

In operation 660, the ray tracing core 100 performs shading based on a result of the intersection test, i.e., the ray tracing core 100 determines a color value of a pixel based on the result of the intersection test.

When operation 660 is completed, the ray tracing core 100 proceeds to operation 610. In operation 610, the ray tracing core 100 generates a reflection ray. Then the ray tracing core 100 performs operations 620 through 660 again. The ray tracing core 100 performs a traversal of an acceleration structure, an intersection test, and shading using the identification information corresponding to the generated reflection ray.

Then, the ray tracing core 100 proceeds to operation 610 again. In operation 610, the ray tracing core 100 generates a refraction ray. Then the ray tracing core 100 performs operations 620 through 660 again. The ray tracing core 100 performs a traversal of an acceleration structure, an intersection test, and shading using identification information corresponding to the generated refraction ray.

An order of the operation of generating and processing a reflection ray and the operation of generating and processing a refraction ray may be interchanged.

Figure 7:
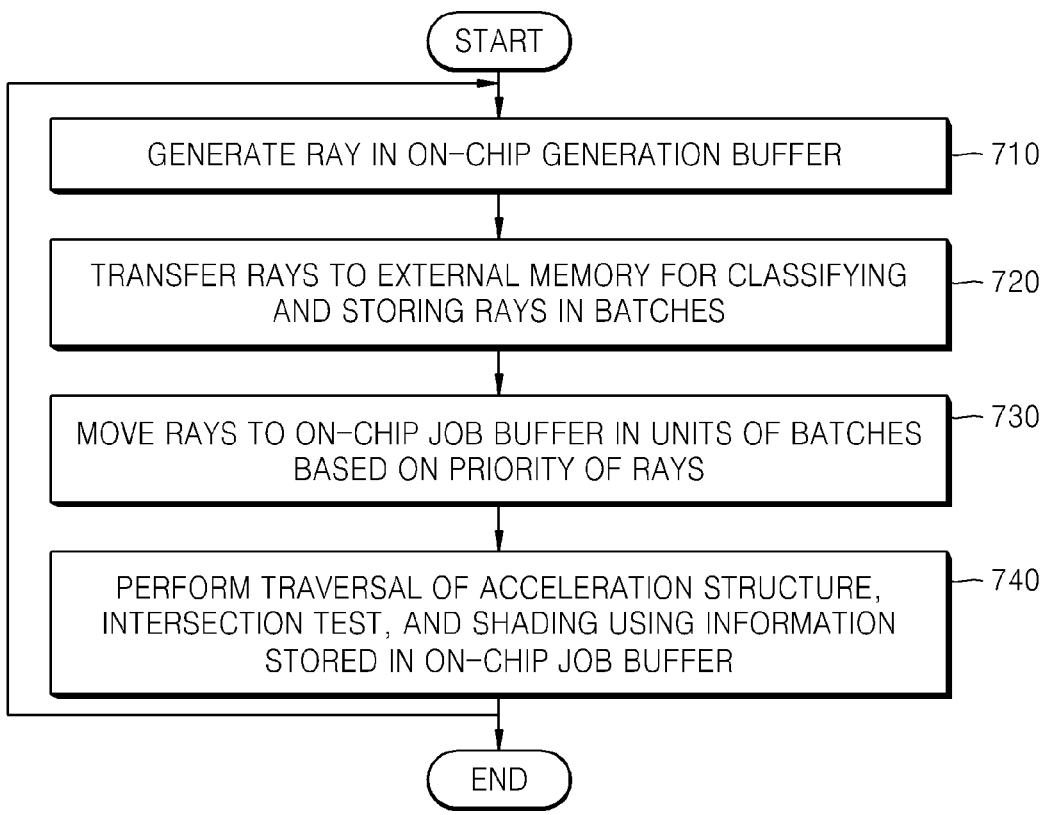
FIG. 7 is a diagram illustrating an example of a method of generating a secondary ray, traversing an acceleration structure using the generated secondary ray, and performing an intersection test and shading, using the ray tracing core.

FIG. 7 is a diagram illustrating an example of a method of generating a secondary ray, traversing an acceleration structure using the generated secondary ray, and performing an intersection test and shading, using the ray tracing core 100. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently.

FIG. 7 is a diagram illustrating an example to explain an operation of the ray tracing core 100 described above with reference to FIG. 2. Thus, descriptions of the ray tracing core 100 also applies to the ray tracing of FIG. 7, and will not be repeated here.

In operation 710, the ray tracing core 100 generates a secondary ray using the refraction ray buffer 151, the reflection ray buffer 152, or the shadow ray buffer 153 included in the on-chip memory 150.

In operation 720, the ray tracing core 100 transmits identification information about the generated secondary ray (i.e., information about a starting point and a direction of a ray) to the external memory 250. The external memory 250 classifies the transmitted identification information based on the type of secondary rays and stores the same. The external memory 250 may collect the transmitted identification information in batches and store the same.

In operation 730, the external memory 250 transmits identification information according to a priority of secondary rays, to the job buffer 154 in the on-chip memory 150. The external memory 250 may transmit the identification information in batches. In an example, the priority of secondary rays may be in an order of a shadow ray, a reflection ray, and a refraction ray. In another example, the priority of secondary rays may be in an order of a shadow ray, a refraction ray, and a reflection ray.

The external memory 250 may include a counting unit (not shown), and the counting unit may count the number of secondary rays indicated by the identification information stored in the external memory 250. In another example, the counting unit may be included in the ray tracing core 100 and not in the external memory 250. The counting unit may count the number of secondary rays transmitted from the ray tracing core 100 to the external memory 250, i.e., the number of pieces of identification information of the secondary rays.

If the number of secondary rays is equal to or greater than the number of batches, the counting unit may generate a signal requesting transmission of the identification information stored in batches in the external memory 250 to the job buffer 154. Then, the external memory 250 may transmit the stored identification information to the job buffer 154 in batches using the signal generated by the counting unit.

If the number of counted secondary rays is less than the number of batches, the counting unit may generate a signal requesting the ray tracing core 100 to regenerate a primary signal. The ray tracing core 100 (specifically, the ray generating unit 110) may regenerate a primary ray using the signal generated by the counting unit. The regenerated primary ray is stored in the job buffer 154 in the on-chip memory 150. The regenerated primary ray refers to a primary ray that includes different information from the primary ray generated by the ray generating unit 110 described above with reference to FIG. 2.

If there is no primary ray for the ray generating unit 110 to generate, the ray generating unit 110 transmits a signal to the counting unit, which indicates that there is no primary ray to be generated again. The counting unit generates a signal requesting the transmission of the identification information stored in the external memory 250 to the job buffer 154. The external memory 250 may transmit the stored identification information to the job buffer 154 in batches, using the signal generated by the counting unit.

In operation 740, the ray tracing core 100 may perform a traversal of an acceleration structure, an intersection test, and shading, using the identification information stored in the job buffer 154 of the on-chip memory 150.

As described above, the external memory 250 may allocate buffers according to types of secondary rays, and transmit the stored identification information of the secondary rays in batches, to the ray tracing core 100. When the ray tracing core 100 performs a traversal of an acceleration structure, an intersection test, and shading, locality of data may be increased, thereby improving processing speed.

Figure 8:
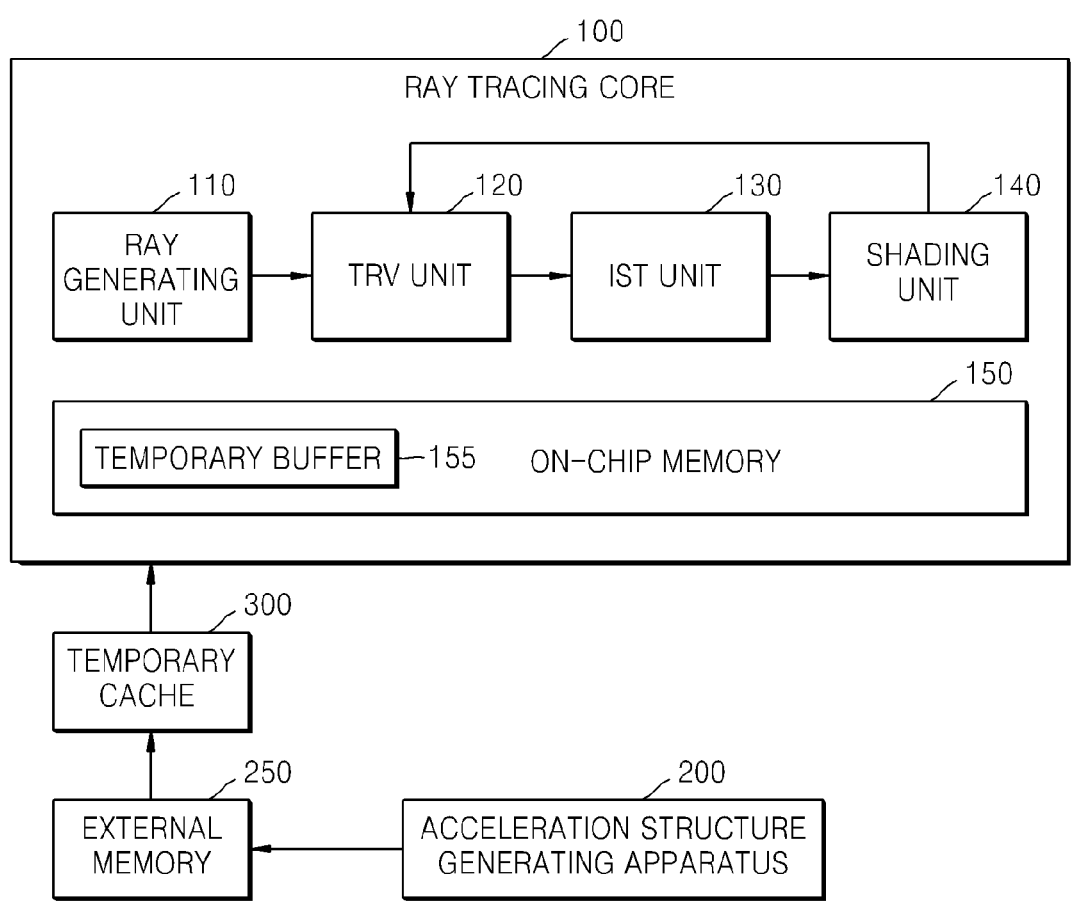
FIG. 8 is a diagram illustrating an example of a ray tracing system.

FIG. 8 is a diagram illustrating an example of a ray tracing system.

Referring to FIG. 8, a temporary buffer 155 may be included in a predetermined area in the on-chip memory 150 of the ray tracing core 100 illustrated in FIG. 2. A temporary cache 300 may be further included between the ray tracing core 100 and the external memory 250. In another example, just one of the temporary buffer 155 and the temporary cache 300 may also be included.

The temporary buffer 155 or the temporary cache 300 may reduce an overhead when data is transmitted or received, between the ray tracing core 100 and the external memory 250. The overhead of a system increases proportionally with the number of times that data is transmitted or received between the ray tracing core 100 and the external memory 250. The temporary buffer 155 or the temporary cache 300 may collect identification information regarding a secondary ray in units of batches, and the collected identification information may be transmitted to the ray tracing core 100 or the external memory 250. As the number of times that data is transmitted or received between the ray tracing core 100 and the external memory 250 is reduced, the overhead of the system may also be reduced.

Figure 9:
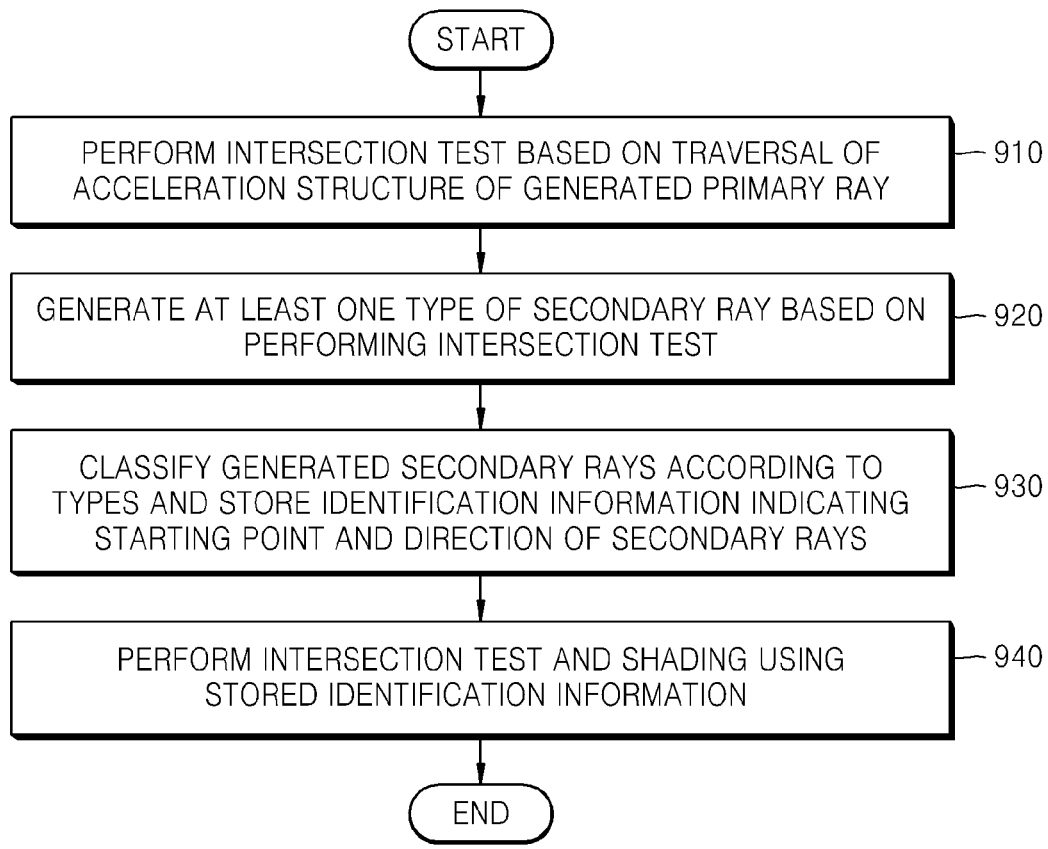
FIG. 9 is a diagram illustrating an example of a method of performing ray tracing by the ray tracing core.

FIG. 9 is a diagram illustrating an example of a method of performing ray tracing using the ray tracing core 100. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently.

Referring to FIG. 9, the method of performing ray tracing includes operations that are performed in a time series in the ray tracing system illustrated in FIGS. 2 and 8. Thus, descriptions of the ray tracing system illustrated in FIGS. 2 and 8 or the method of FIGS. 3 and 6 also apply to the method of performing ray tracing of FIG. 9, and will not be repeated here.

In operation 910, the ray tracing core 100 performs an intersection test based on a result of traversal of an acceleration structure with respect to a generated primary ray. The TRV unit 120 of the ray tracing core 100 traverses an acceleration structure with respect to the generated primary ray. Then the IST unit 130 of the ray tracing core 100 performs an intersection test based on a result of the traversal of the acceleration structure.

In operation 920, the shading unit 140 may generate secondary rays of at least one type, based on a result of the intersection test. The types of secondary rays may include shadow rays, reflection rays, and refraction rays.

In operation 930, the external memory 250 may classify the generated secondary rays based on its type and may store identification information indicating a starting point and a direction of the secondary rays.

In operation 940, the ray tracing core 100 may perform an intersection test and shading using the stored identification information. The TRV unit 120 may traverse an acceleration structure using the stored identification information. Then the IST unit 130 may perform the intersection test based on a result of traversal of an acceleration structure. The shading unit 140 may perform shading based on a result of the intersection test.

As described above, according to the one or more of the above examples, loss of information about a secondary ray that is dynamically generated when rendering a three-dimensional (3D) image by performing ray tracing, due to an overflow of a buffer, may be prevented. In addition, when performing a traversal of an acceleration structure with respect to a secondary ray, and an intersection test and shading with respect to the secondary ray, locality of a ray may be increased, thereby improving a processing speed.

The processes, functions, and methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of performing ray tracing to generate a rendered image, the method comprising:
   performing, using at least one processing device of a ray tracing core, a first intersection test based on a traversal of an acceleration structure using a generated primary ray;
   generating secondary rays based on the first intersection test;
   classifying the generated secondary rays and storing respective identification information indicating a starting point and a direction of each of the secondary rays;
   determining whether to regenerate the primary ray based on a number of the generated secondary rays and storing identification information of the regenerated primary ray when the primary ray is regenerated;
   performing a second intersection test by the ray tracing core using the stored respective identification information;
   generating a color value of each of pixels comprised in an image by performing shading based on results of the second intersection test; and
   generating the rendered image which reflects the generated color values.

2. The method of claim 1, wherein the generating of secondary rays includes generating plural types of secondary rays, the types of the secondary rays comprising at least two of a reflection ray type, a refraction ray type, and a shadow ray type.

3. The method of claim 1, wherein the generating of the secondary rays comprises generating at least one shadow ray based on a number of light sources and generating at least one of a reflection ray or a refraction ray based on the second intersection test.

4. The method of claim 1, wherein the performing of the second intersection test comprises performing the second intersection test using identification information corresponding to a shadow ray from among the secondary rays, and the method further includes performing a third intersection test using identification information, from the stored respective identification information, corresponding to a reflection ray from among the secondary rays, after the second intersection test and the shading is performed.

5. The method of claim 1, wherein the performing of the second intersection test comprises performing the second intersection test using identification information corresponding to a shadow ray from among the secondary rays, and the method further includes performing a third intersection test using identification information, from the stored respective identification information, corresponding to a refraction ray from among the secondary rays, after the second intersection test and the shading is performed.

6. The method of claim 1, wherein the storing of the respective identification information comprises storing the respective identification information by allocating different buffer sizes in a memory for respectively collectively storing a plurality of each type of the secondary rays.

7. The method of claim 6, wherein the memory is controlled to store the respective identification information by allocating the buffer sizes based on at least one of a number of light sources, a depth of a reflection ray included in the secondary rays, and a depth of a refraction ray included in the secondary rays.

8. The method of claim 1, further comprising counting the number of the secondary rays based on the stored respective identification information,
wherein the performing of the second intersection test comprises performing the second intersection test using the stored respective identification information in response to the counted number of the secondary rays being equal to or greater than a number of batches of stored identification information.

9. The method of claim 8, further comprising regenerating the primary ray in response to the counted number of the secondary rays being less than the number of batches, and
wherein the performing of the second intersection test comprises performing the intersection test using the regenerated primary ray.

10. The method of claim 1, wherein the classifying of the generated secondary rays and storing of the respective identification information includes storing, to an exterior memory exterior to the ray tracing core and allocated at least for plural secondary rays of a same type in accordance with the classifying, the respective identification information determined by the generating of the secondary rays.

11. The method of claim 10, wherein the respective identification information transferred to the exterior memory is differently stored in the exterior memory according to different type classifications of the secondary rays.

12. The method of claim 11, wherein the different storing of the respective identification information in the exterior memory includes storing identification information for refraction secondary rays in a refraction ray buffer of a first allocated size, based on a set depth for refraction secondary rays and a set depth for reflection secondary rays, storing identification information for reflection secondary rays in a reflection ray buffer of a second allocated size based on the set depth for reflection secondary rays, and storing identification information for shadow secondary rays in a shadow ray buffer of a third allocated size based on a number of light sources in the image.

13. The method of claim 10, further comprising transferring the respective identification information from the exterior memory to a job buffer of the ray tracing core in batches, including transferring identification information for different types of secondary rays in a prioritized order, for a transferred batch of secondary rays, based on which type of secondary ray is represented by each of the identification information of the transferred batch.

14. The method of claim 13, wherein the prioritized order gives greater preference to identification information for a shadow secondary ray than identification information for a reflection secondary ray or a refraction secondary ray.

15. The method of claim 1, wherein the generating of the secondary rays further comprises storing the respective identification information for each of the secondary rays in different secondary ray buffers, respectively based on different type classifications of the secondary rays, of the ray tracing core.

16. The method of claim 15, wherein the storing of the respective identification information in the different secondary ray buffers of the ray tracing core includes storing identification information for refraction or reflection secondary rays in a refraction or reflection ray buffer of a first allocated size based on a set number of batches of intersection points to be produced by the ray tracing core, and storing identification information for shadow secondary rays in a shadow ray buffer of a second allocated size based on the set number and a number of light sources in the image.

17. A non-transitory computer-readable recording medium having embodied thereon a program to control at least one processing device to implement the method of claim 1.

18. A ray tracing apparatus to generate a rendered image, the apparatus comprising:
one or more processing devices, of a ray tracing core, configured to perform a first intersection test based on a traversal of an acceleration structure using a generated primary ray and to generate secondary rays based on the first intersection test; and
a memory configured to classify the generated secondary rays and to store respective identification information indicating a starting point and a direction of each of the secondary rays,
wherein the one or more processing devices are further configured to determine whether to regenerate the primary ray based on a number of the generated secondary rays, perform a second intersection test based on a traversal of the acceleration structure using the stored respective identification information, generate a color value of each of pixels comprised in an image by performing a shading based on the second intersection test, and generate the rendered image which reflects the generated color values,
wherein the memory is further configured to store identification information of the regenerated primary ray when the primary ray is regenerated.

19. The apparatus of claim 18, wherein, for the generating of secondary rays, the one or more processing devices are configured to generate plural types of secondary rays, the types of the secondary rays comprising at least two of a reflection ray type, a refraction ray type, and a shadow ray type.

20. The apparatus of claim 18, wherein the secondary rays include at least one shadow ray based on a number of light sources and at least one of a reflection ray or a refraction ray based on the second intersection test.

21. The apparatus of claim 18, wherein the one or more processing devices are further configured to perform the second intersection test using identification information corresponding to a shadow ray from among the secondary rays, and to perform a third intersection test using identification information, from the stored respective identification information, corresponding to a reflection ray from among the secondary rays, after the second intersection test and the shading are performed.

22. The apparatus of claim 18, wherein the one or more processing devices are further configured to perform the second intersection test using identification information corresponding to a shadow ray from among the secondary rays, and to perform a third intersection test using identification information, from the stored respective identification information, corresponding to a refraction ray from among the secondary rays, after the second intersection test and the shading are performed.

23. The apparatus of claim 18, wherein the memory is further configured to store the respective identification information by allocating different buffer sizes for respectively collectively storing a plurality of each type of the secondary rays.

24. The apparatus of claim 23, wherein the memory is further configured to allocate the buffer sizes based on at least one of a number of light sources, a depth of a reflection ray included in the secondary rays, and a depth of a refraction ray included in the secondary rays.

25. The apparatus of claim 18,
wherein the one or more processing devices are further configured to perform the second intersection test using the stored respective identification information based on a counting of the number, based on the stored respective identification information, of the secondary rays being equal to or greater than a number of batches of stored identification information.

26. The apparatus of claim 25, wherein the one or more processing devices are further configured to regenerate the primary ray in response to the counted number of the secondary rays being less than the number of batches, and to perform the second intersection test using the regenerated primary ray.

27. The apparatus of claim 18, wherein the memory is an exterior memory, exterior to the ray tracing core and allocated at least for plural secondary rays of a same type in accordance with the classifying.

28. A method of performing ray tracing to render an image, the method comprising:
performing, using at least one processing device of a ray tracing core, a first intersection test based on a traversal of an acceleration structure using a generated primary ray;
generating secondary rays based on the first intersection test and storing respective identification information, indicating a starting point and a direction, for each of the secondary rays in at least one ray buffer of the ray tracing core;
determining whether to regenerate the primary ray based on a number of the generated secondary rays and storing identification information of the regenerated primary ray when the primary ray is regenerated;
transferring, to an exterior memory exterior to the ray tracing core, the respective identification information stored in the at least one ray buffer;
transferring in batches, to a job buffer of the ray tracing core, the transferred respective identification information in the exterior memory;
performing a second intersection test by the ray tracing core using the transferred respective identification information in the job buffer; and
generating a color value for a pixel of the image by performing shading based on graphics data corresponding to results of the second intersection test.

29. The method of claim 28, wherein the transferring of the respective identification information stored in the at least one ray buffer is performed in batches of identification information.

30. The method of claim 28, further comprising transferring the graphics data, corresponding to intersection information determined by the second intersection test, from the exterior memory to the ray tracing core for the performing of the shading.

31. The method of claim 28, wherein the storing of the respective identification includes storing the respective identification information in different secondary ray buffers, respectively based on different type classifications of the secondary rays.

32. The method of claim 31, wherein the storing of the respective identification information in the different secondary ray buffers of the ray tracing core includes storing identification information for refraction or reflection secondary rays in a refraction or reflection ray buffer of a first allocated size based on a set number of batches of intersection points to be produced by the ray tracing core, and storing identification information for shadow secondary rays in a shadow ray buffer of a second allocated size based on the set number and a number of light sources in the image.

33. The method of claim 28, further comprising controlling, upon a determination that a number of identification information transferred to the exterior memory or number of identification information stored in the exterior memory meets a set number of secondary rays, transfer of a batch of identification information of plural secondary rays from the exterior memory to the ray tracing core for the performing of the second intersection test.

34. The method of claim 28, wherein the generating of the secondary rays and the generating of a color value for the pixel are both performed by at least one shader processing device, and the traversal of the acceleration structure, the first intersection test, and the second intersection test are performed by at least one traversal and intersection device configured with a traversal device component and an intersection device component.

35. The method of claim 28, wherein the transferring of the respective identification information to the job buffer in batches includes transferring identification information for different types of secondary rays in a prioritized order, for a transferred batch of secondary rays, based on which type of secondary ray is represented by each of the identification information of the transferred batch.

36. The method of claim 35, wherein the prioritized order gives greater preference to identification information for a shadow secondary ray than identification information for a reflection secondary ray or a refraction secondary ray.

* * * * *